(12) United States Patent
Alemanno et al.

(10) Patent No.: US 10,647,308 B2
(45) Date of Patent: May 12, 2020

(54) BRAKE-BY-WIRE BRAKING SYSTEM FOR VEHICLES PROVIDED WITH HYDRAULIC FEEDBACK SIMULATOR AND METHOD OF ACTUATING A BRAKING SYSTEM FOR VEHICLES THEREOF

(71) Applicant: FRENI BREMBO S.P.A., Curno, Bergamo (IT)

(72) Inventors: Fabio Alemanno, Curno (IT); Francesco Dozzi, Curno (IT); Luca Ugolini, Curno (IT); Fabrizio Forni, Curno (IT); Luca Pagani, Curno (IT); Beniamin Szewczyk, Curno (IT); Valerio Galizzi, Curno (IT)

(73) Assignee: Freni Brenbo S.p.A., Curno, Bergamo (IT)

( * ) Notice: Subject to any disclaimer, the term of this patent is extended or adjusted under 35 U.S.C. 154(b) by 32 days.

(21) Appl. No.: 15/779,936

(22) PCT Filed: Dec. 7, 2016

(86) PCT No.: PCT/IB2016/057411
§ 371 (c)(1),
(2) Date: May 30, 2018

(87) PCT Pub. No.: WO2017/098419
PCT Pub. Date: Jun. 15, 2017

(65) Prior Publication Data
US 2019/0001946 A1     Jan. 3, 2019

(30) Foreign Application Priority Data
Dec. 9, 2015 (IT) .................... 102015000081315

(51) Int. Cl.
*B60T 8/40* (2006.01)
*B60T 13/66* (2006.01)
(Continued)

(52) U.S. Cl.
CPC ............ *B60T 13/662* (2013.01); *B60T 7/042* (2013.01); *B60T 8/409* (2013.01); *B60T 13/686* (2013.01);
(Continued)

(58) Field of Classification Search
CPC .......... B60T 2270/82; B60T 2270/404; B60T 8/4081; B60T 8/4086; B60T 8/409
(Continued)

(56) References Cited

U.S. PATENT DOCUMENTS 6,464,307 B1 * 10/2002 Yoshino ................. B60T 7/042
                                                           303/11
2004/0046652 A1 * 3/2004 Yokoyama ............. B60T 7/042
                                                            340/454
(Continued)

FOREIGN PATENT DOCUMENTS

DE          3622388 A1     1/1987
DE         10346674 A1     1/2005
(Continued)

OTHER PUBLICATIONS

European Patent Office, International Search Report with Written Opinion issued in PCT/IB2016/057411, dated Mar. 6, 2017, 12 pages, European Patent Office, Rijswijk, Netherlands.

*Primary Examiner* — Nicholas J Lane
(74) *Attorney, Agent, or Firm* — Marshall & Melhorn, LLC

(57) ABSTRACT

A braking system for vehicles having a processing and control unit operatively connected to a pilot pump and a motor for actuating at least one braking device. The processing and control unit being programmed so as to actuate the braking device via the motor as a function of the actuation of the pilot pump through a manual actuation device, in a "by-wire" operating condition.

6 Claims, 2 Drawing Sheets

(51) Int. Cl.
*B60T 7/04* (2006.01)
*B60T 13/68* (2006.01)
*B60T 17/22* (2006.01)

(52) U.S. Cl.
CPC ............ *B60T 17/22* (2013.01); *B60T 8/4081* (2013.01); *B60T 2270/82* (2013.01)

(58) Field of Classification Search
USPC ...................................................... 303/116.2
See application file for complete search history.

(56) References Cited

U.S. PATENT DOCUMENTS

| | | | |
|---|---|---|---|
| 2010/0148571 A1 | 6/2010 | Kim | |
| 2014/0345272 A1* | 11/2014 | Kistner | ................. B60T 8/4081 60/537 |
| 2015/0344014 A1* | 12/2015 | Knechtges | .............. B60T 7/042 701/70 |
| 2017/0158179 A1* | 6/2017 | Choi | ........................ B60T 7/042 |
| 2017/0225664 A1* | 8/2017 | Beever | .................... B60T 7/042 |
| 2018/0056956 A1* | 3/2018 | Kim | ......................... B60T 7/042 |
| 2018/0065606 A1* | 3/2018 | Brok | ........................ B60T 8/32 |
| 2018/0229702 A1* | 8/2018 | Son | ........................ B60T 8/4086 |
| 2019/0193700 A1* | 6/2019 | Kuhlman | .............. B60T 8/4081 |

FOREIGN PATENT DOCUMENTS

| | | |
|---|---|---|
| DE | 102005012775 A1 | 10/2006 |
| DE | 102013204778 A1 | 9/2013 |
| EP | 1138564 A2 | 10/2001 |
| WO | 03093082 A1 | 11/2003 |

\* cited by examiner

BRAKE-BY-WIRE BRAKING SYSTEM FOR VEHICLES PROVIDED WITH HYDRAULIC FEEDBACK SIMULATOR AND METHOD OF ACTUATING A BRAKING SYSTEM FOR VEHICLES THEREOF

FIELD OF APPLICATION

This invention regards a brake-by-wire braking system for vehicles equipped with a hydraulic feedback simulator, and a related method of actuating a vehicle braking system.

STATE OF THE ART

In particular, this invention relates to the field of pedal simulators for "by wire" braking systems for cars. In general, this invention also relates to manual simulators of any type, hence also with lever, for "by wire" braking systems of vehicles in general, therefore also including motor vehicles, heavy vehicles and the like.

In "by-wire" systems there is generally a decoupling between the force and displacement imparted to the pedal or lever by the user and the pressure/force actually applied in the callipers or other braking devices connected to the vehicle wheels.

A simulator of manual actuation devices, be they pedals or levers, can be achieved with the use of different technologies all comprising means for electrical actuation of the independent braking devices by the operator's manual actuation. Such electric actuation means typically comprise electric motors that actuate the braking devices as a function of the braking request made by the user by means of the manual actuation devices. Therefore, in normal operating conditions, there is never a direct connection between the manual actuation device and the braking devices; obviously, simulators are provided that return a resistance to the user equivalent to that of a traditional braking system.

Typically the simulator is composed of a master cylinder, i.e., a main pump connected to the manual actuation device (pedal or lever) through a main branch, and a sorbing device that returns a response to the user equivalent to that normally generated by a braking device in a conventional braking system. As seen, the true braking action is instead performed by the electric actuation means that actuate the braking devices directly as a function of the braking force requested by the user.

Furthermore, the known braking systems provide a secondary or back-up branch that serves to directly connect the master cylinder to the braking devices in case of malfunction or power failure of the electric actuation means. This back-up branch is evidently a safety that, even in case of malfunction of the electrical devices, allows to actuate operate the braking devices as occurs in a conventional hydraulic system.

The main and secondary branches are typically managed by suitable valves; in particular, a first normally-open valve is used to isolate the master cylinder from the back-up branch and to connect the hydraulic sorbing device with the master cylinder: in this way, the necessary feedback (pedal or lever force-pedal or lever travel) is provided to the driver.

A second normally-closed valve is also provided on the connection branch between the master cylinder and sorbing device. This second valve is, instead, open in case of malfunction or power failure: thanks to this second valve, the master cylinder is directly connected to the braking devices so as to allow their direct actuation by the user.

The known solutions are certainly safe but do not allow returning to the user a feeling of the actual actuation of the braking devices and, especially, in case of braking correction due, for example to the locking one or more wheels of the vehicle, do not return to the user the feeling of the actual occurrence of the dynamic instability of the vehicle and the due to correction by the system.

In other words, in brake-by-wire systems of the known type, the user is not aware of the braking correction intervention performed by the controller of the system both to avoid the locking of one or more wheels and to correct for example an erroneous trajectory and/or an excessive braking as a function of such trajectory.

The fact that the user is not aware, at the pedal or lever, of the correction intervention due to a dynamic instability of the vehicle is dangerous because the user, unaware of this instability, does not change his driving style accordingly. It is clear that braking correction systems, whether merely anti-locking and/or trajectory correcting by braking one or more wheels, are able to correct driver errors within certain limits; if the driver is not aware that his driving style is putting the vehicle in stability limit conditions in relation to the path followed, the situation may become dangerous.

In fact, there may be driving conditions that are uncorrectable by the braking system and therefore there can occur dangerous and sudden losses of control of the vehicle, without the driver having any warning of such events.

PRESENTATION OF THE INVENTION

To date, no specific solutions have been adopted in the art to solve the above problems.

In fact, the known brake-by-wire systems provide solutions aimed at improving the passive safety of the system by ensuring braking in the event of electrical malfunction, or even solutions aimed at faithfully reproducing the travel/resistance law at the pedal or lever of a conventional hydraulic system. In any case, the known systems are always designed so as to avoid any feedback to the pedal or lever of possible braking correction interventions by the system.

Therefore, there is an increasingly felt need to solve the above drawbacks and limitations of the prior art. In other words, the need is felt to provide a by-wire braking system that is able to warn the user of correction interventions performed by the system on the user's braking request, i.e., a system that is able to warn to the user of vehicle instability phenomena due to his driving style in relation to ground conditions.

This need is met by a braking system for vehicles according to claim 1 and by a method for the actuation of a braking system for vehicles according to claim 7.

In particular, this need is met by a braking system for vehicles comprising a pilot pump equipped with a manual actuation means, a lever and/or pedal, which is fluidically connected, through a first hydraulic conduit, to a sorbing device that simulates the actuation resistance offered by a hydraulically operated braking device, wherein along said first hydraulic conduit is arranged a first shut-off valve, a second hydraulic conduit operatively connected to at least one braking device associated with a wheel of said vehicle, said second hydraulic conduit being connected to the first hydraulic conduit through a second shut-off valve, the system comprising a processing and control unit operatively connected to the pilot pump and motor means for actuating said at least one braking device, the processing and control unit being programmed so as to actuate the braking device via the motor means as a function of the actuation of the pilot pump through the manual actuation means, in a "by-wire" operating condition, in said "by-wire" operating condition, the first shut-off valve being selectively opened and the second shut-off valve being closed, characterised in that the processing and control unit is programmed to oversee the operation of the braking system so as to correct the braking action requested by the user via the manual actuation means, by actuating the motors means so as to avoid the locking of one or more wheels or the onset of instability of the vehicle during braking, said processing and control unit being programmed to induce on the manual actuation means at least a vibration when it corrects the braking action requested by the user.

According to a possible embodiment the processing and control unit is programmed so that, during the correction of the braking action requested by the user, it alternately opens and closes the first shut-off valve so as to create a pressure variation on the manual actuation means.

According to a possible embodiment, the system comprises means for varying the pressure in the first hydraulic conduit operatively connected to the processing and control unit so as to change the pressure in said first hydraulic conduit to induce at least a vibration on the manual actuation means, during the correction of the braking action requested by the user.

According to a possible embodiment, said means for varying the pressure in the first hydraulic conduit comprise an axial or radial piston pump fluidically connected with said first hydraulic conduit.

According to a possible embodiment, said means for varying the pressure in the first hydraulic conduit comprise a cam-piston system, the piston being fluidically connected with said first hydraulic conduit.

According to a possible embodiment, the system comprises movable mechanical means arranged between the manual actuation means and the pilot pump, said movable mechanical means being operatively connected to the processing and control unit that is programmed so as to induce vibrations on the manual actuation means by actuating the movable mechanical means, during the correction of the braking action requested by the user.

According to a possible embodiment the movable mechanical means comprise a rotary motor provided with eccentric mass with respect to a rotation axis of the motor.

According to a possible embodiment the movable mechanical means comprise an electric motor provided a related translating mass.

According to a possible embodiment, during the correction of the braking action requested by the user, the processing and control unit is programmed to close the first shut-off valve and to actuate the movable mechanical means.

According to a possible embodiment, during the correction of the braking action requested by the user, the processing and control unit is programmed to open the first shut-off valve and to actuate the movable mechanical means.

According to a possible embodiment, during the correction of the braking action requested by the user, the processing and control unit is programmed to alternatively open and close the first shut-off valve and to actuate the movable mechanical means.

According to a possible embodiment, the braking device comprises a disc, drum or shoe brake.

According to a possible embodiment, the processing and control unit is programmed so that, in a power failure condition in which the motor means malfunction, for the actuation of said at least one braking device, it commands the closing of the first shut-off valve and the opening the second shut-off valve so as to allow the direct hydraulic actuation of the braking devices by means of the pilot pump.

This invention also relates to a method of actuating a braking system for vehicles comprising the steps of providing a pilot pump equipped with a manual actuation means, a lever and/or pedal, which is fluidically connected, through a first hydraulic conduit, to a sorbing device that simulates the actuation resistance offered by a hydraulically operated braking device, wherein along said first hydraulic conduit is arranged a first shut-off valve, providing a second hydraulic conduit operatively connected to at least one braking device associated with a wheel of said vehicle, said second hydraulic conduit being connected to the first hydraulic conduit through a second shut-off valve, providing a processing and control unit operatively connected to the pilot pump and to motor means for actuating said at least one braking device as a function of the actuation of the pilot pump through the manual actuation means, in a "by-wire" operating condition, in said "by-wire" operating condition the first shut-off valve being selectively open and the second shut-off valve being closed, correcting the braking action requested by the user via the manual actuation means, by means of the processing and control unit which actuates the motor means so as to avoid locking of one or more wheels or the onset of instability of the vehicle during braking, inducing on the manual actuation means at least a vibration when the processing and control unit corrects the braking action requested by the user.

This invention also relates to a method for actuating a braking system as described above.

DESCRIPTION OF THE DRAWINGS

Further characteristics and advantages of this invention will be more understandable from the following description of its preferred and non-limiting examples of embodiments, in which.

The elements, or parts of elements, in common between the embodiments described below will be indicated with the same reference numbers.

DETAILED DESCRIPTION

Figure 1:
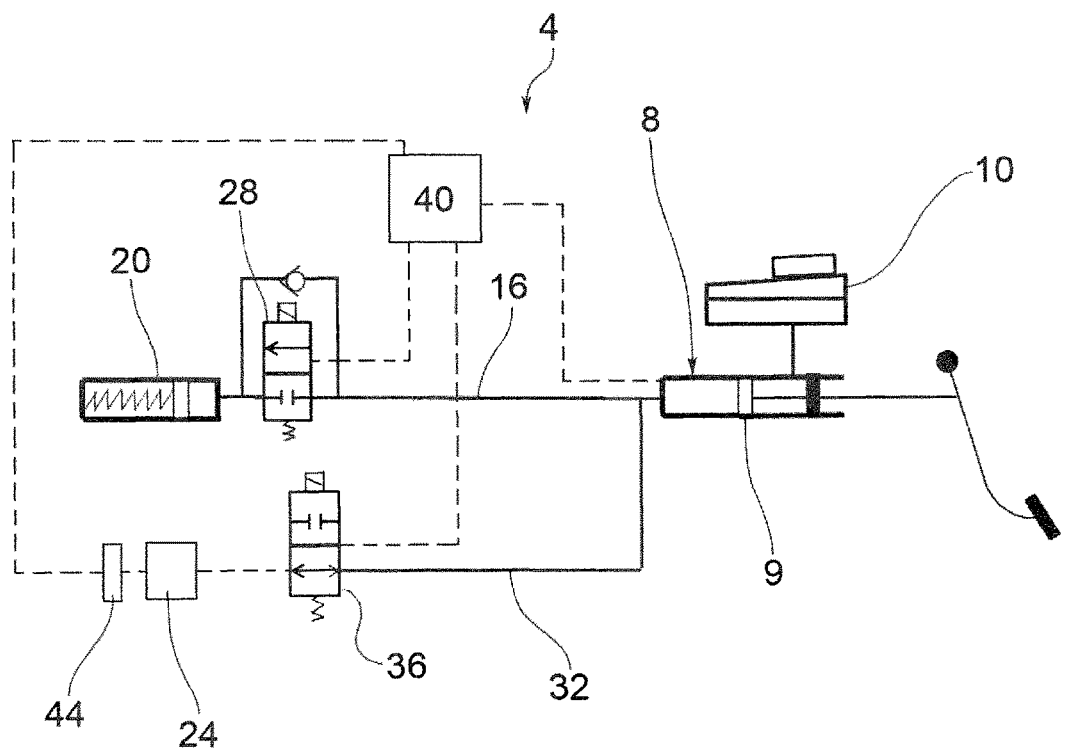
FIG. 1 is a schematic view of a braking system for vehicles according to a first embodiment of this invention.

With reference to the above figures, the reference number 4 globally indicates a braking system for vehicles.

For the purposes of this invention, "vehicles" means both cars and motorcycles.

The braking system 4 for vehicles comprises a pilot pump 8 provided with a manual actuation means 12, lever and/or pedal.

Typically the pilot pump 8 comprises a float that is put in motion by the mechanical action of the user on the manual actuation means 12, whether lever or pedal. The float 9 has the function of pressurising a brake fluid in a known manner. The brake fluid is in turn contained in a tank 10 fluidically connected to the pilot pump 8, in a known manner.

The pilot pump 8 is fluidically connected, through a first hydraulic conduit 16 containing brake fluid in a known manner, to a sorbing device 20 that simulates the actuation resistance offered by a hydraulically operated braking device 24.

The sorbing device 20 serves to provide resistance to the actuation of the manual actuation means 12 so as to simulate the normal resistance that a user would have on the manual actuation means 12 following braking action with the braking device 24. The sorbing device 20 is typically a mechanical device equipped with springs and similar devices for simulating the resistance provided by normal devices.

For the purposes of this invention, the braking device 24 can be of various type, comprising for example a disc, drum or shoe brake.

This invention also applies to braking systems 4 comprising electromechanically operated braking devices 24. Therefore, for the purposes of the scope of protection, the invention also covers braking system 4 solutions comprising said electromechanically operated braking devices 24.

Along said first hydraulic conduit 16 is arranged a first shut-off valve 28.

The first shut-off valve 28 can be opened and closed: in the open configuration, it allows the fluid connection between the pilot pump 8 and the sorbing device 20; in the closed configuration said first shut-off valve 28 disconnects the sorbing device 20 from the pilot pump 8.

The braking system 4 also comprises a second hydraulic conduit 32 operatively connected to at least one braking device 24 associated to a wheel of said vehicle.

The second hydraulic conduit 32 is connected to the first hydraulic conduit 16 through a second shut-off valve 36.

The second shut-off valve 36 can, in turn, be opened and closed; in open conditions, the second shut-off valve 36 allows the fluid connection between the pilot pump 8 and the braking device 24; in this way the user can directly actuate the braking device 24 with a conventional hydraulic actuation by acting on the related manual actuation means 12. In closed condition, the second shut-off valve 36 does not allow the direct fluid connection between the pilot pump 8 and the braking device 24. The user can therefore not directly actuate the braking device 24 by using the manual actuation means 12.

The braking system 4 comprises a processing and control unit 40 operatively connected to the pilot pump 8, and motor means 44 for the actuation of said at least one braking device 24.

The motor means 44 are preferably electric motors able to operate, directly or through interposed kinematic mechanisms, said braking devices 24.

The processing and control unit 40 is advantageously programmed so as to actuate at least one braking device 24 via the motor means 44 as a function of the actuation of the pilot pump 8 through the manual actuation means 12, in a "by-wire" operating condition.

In particular, in said "by-wire" operating condition, the first shut-off valve 28 is selectively open and the second shut-off valve 36 is closed. "Selectively" means that, in this by-wire operating condition, the first shut-off valve 28 can be open or closed, based on the operating conditions established by the processing and control unit 40, as better described below.

Advantageously, the processing and control unit 40 is programmed to oversee the operation of the braking system 4 so as to correct the braking action requested by the user via the manual actuation means 12, by actuating the motors means 44 so as to avoid the locking of one or more wheels or the onset of instability of the vehicle during braking.

In other words, the processing and control unit 40 oversees the operation of the braking system 4 with both antilock function (ABS) of one or more wheels during a braking action and with the vehicle stability control function, during a braking action.

Moreover, the processing and control unit 40 is programmed to induce on the manual actuation means 12 at least a vibration when it corrects the braking action requested by the user.

In other words, in the case in which the processing and control unit 40 must intervene to correct the braking action requested by the user via the manual actuation means 12, the same processing and control unit 40 induces on the manual actuation means 12 at least a vibration so as to clearly warn the user that an action of instability of the vehicle is occurring due to an excess of braking action in relation to the dynamic conditions of the vehicle and adherence with the ground.

According to a possible embodiment (FIG. 1), the processing and control unit 40 is programmed so that, during the correction of the braking action requested by the user, it alternately opens and closes the first shut-off valve 28 so as to create a pressure variation on the manual actuation means 12. In this condition, the second shut-off valve 36 is in closed condition and therefore does not allow the hydraulic connection between the pilot pump 8 and the braking device 24.

In particular, the processing and control unit 40 commands the closing of the first shut-off valve 28: this operation is followed by the generation of a pressure difference in the hydraulic circuit, and in particular in the first hydraulic conduit 16 between upstream and downstream of the first shut-off valve 28, as a result of the pressing of the manual actuation means 12 (either lever or pedal) by the driver. In this way, from the repeated opening and closing the first shut-off valve 28, commanded by the processing and control unit 40, derives the passage of brake fluid in the sorbing device 20 in reduced time intervals. This condition induces a desired vibrational state to the manual actuation means 12, in order to provide feedback to the driver of the vehicle similar to what would occur in the same situation in a vehicle with conventional hydraulic braking system.

Figure 2:
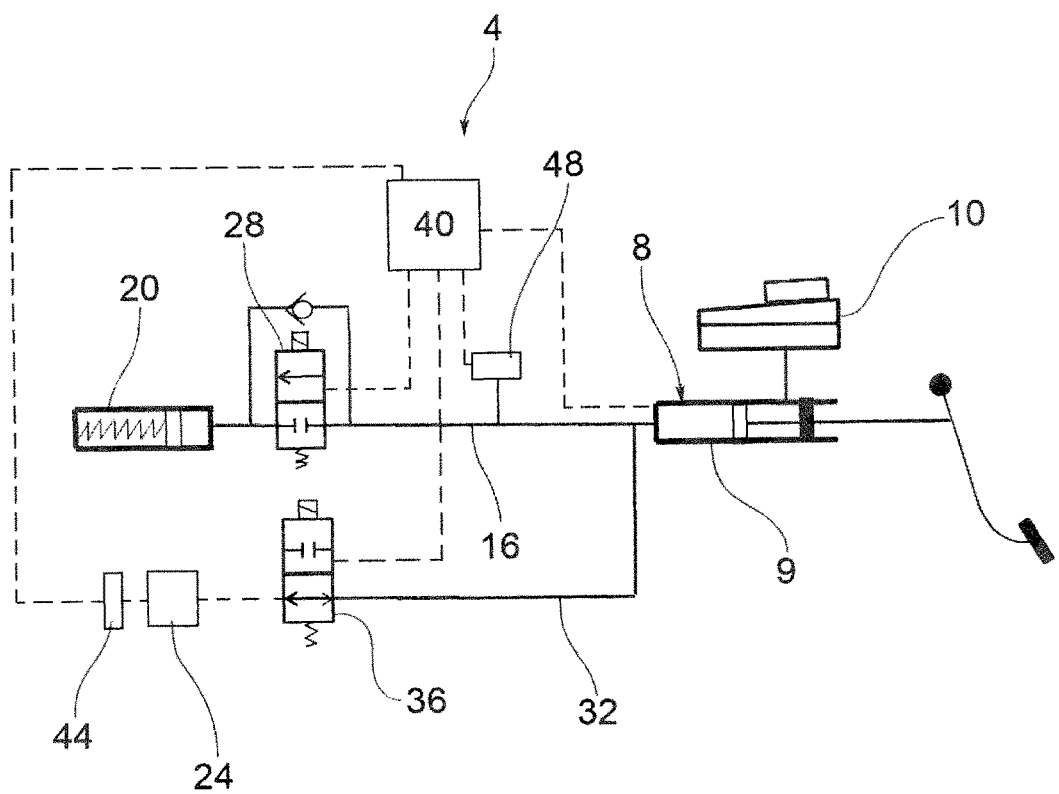
FIG. 2 is a schematic view of a braking system for vehicles according to a second embodiment of this invention.

According to a further embodiment (FIG. 2), the braking system 4 comprises means for varying the pressure in the first hydraulic conduit 16 operatively connected to the processing and control unit 40 so as to change the pressure in said first hydraulic conduit 16 to induce at least a vibration on the manual actuation means 12, during the correction of the braking action requested by the user.

In this condition, the second shut-off valve 36 is in closed condition and therefore does not allow the hydraulic connection between the pilot pump 8 and the braking device 24.

For example, said means for varying the pressure 48 in the first hydraulic conduit 16 comprise an axial or radial piston pump fluidically connected with said first hydraulic conduit 16. This axial or radial piston pump is able to create a cyclic variation of the pressure in the first hydraulic conduit 16 noticeable on the manual actuation means 12 in the form of vibrations.

According to a further embodiment, said means of varying the pressure 48 in the first hydraulic conduit 16 comprise a cam-piston system, in which the piston is fluidically connected with said first hydraulic conduit 16 so as to induce a cyclic variation of the pressure in the first hydraulic conduit 16 noticeable on the manual actuation means 12 in the form of vibrations.

Obviously, in the embodiments with means of varying the pressure 48, said means of varying the pressure 48 will have to generate a hydraulic pressure capable of overcoming the load at the manual actuation means 12 imposed by the driver.

Figure 3:
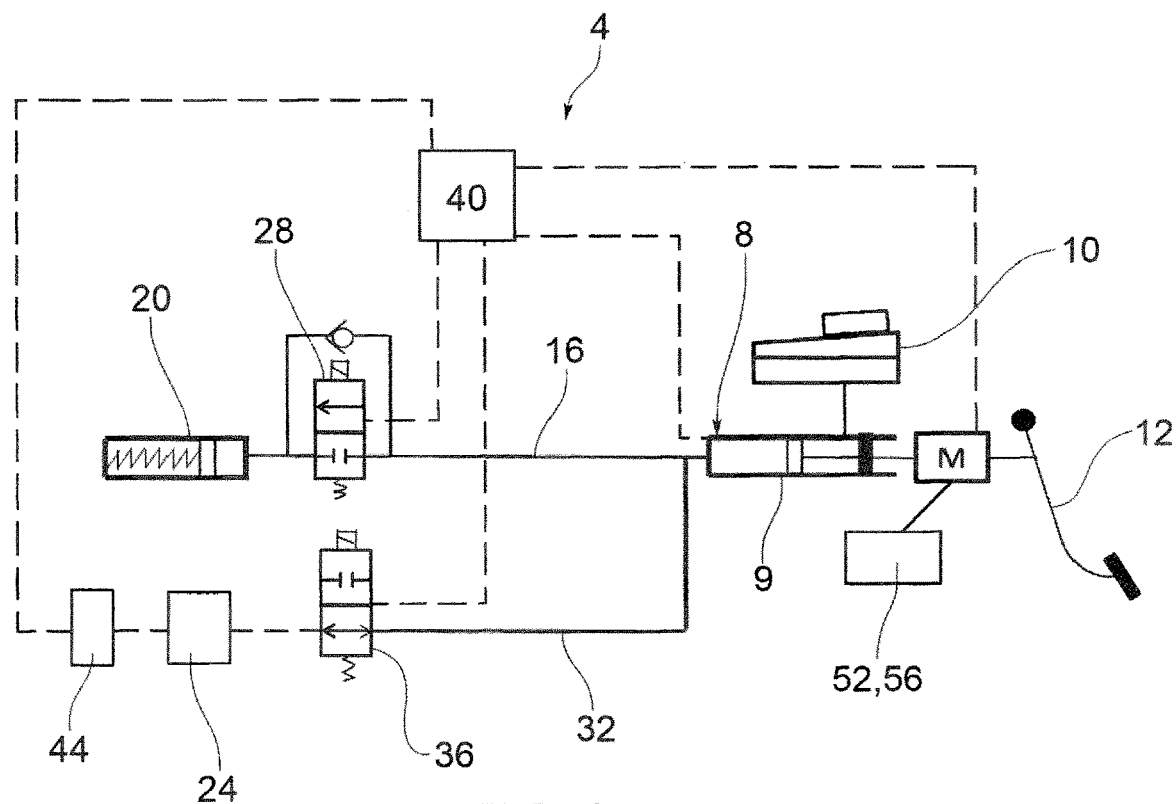
FIGS. 3 and 4 are schematic views of a braking system for vehicles according to a third and fourth embodiment of this invention.
Figure 4:
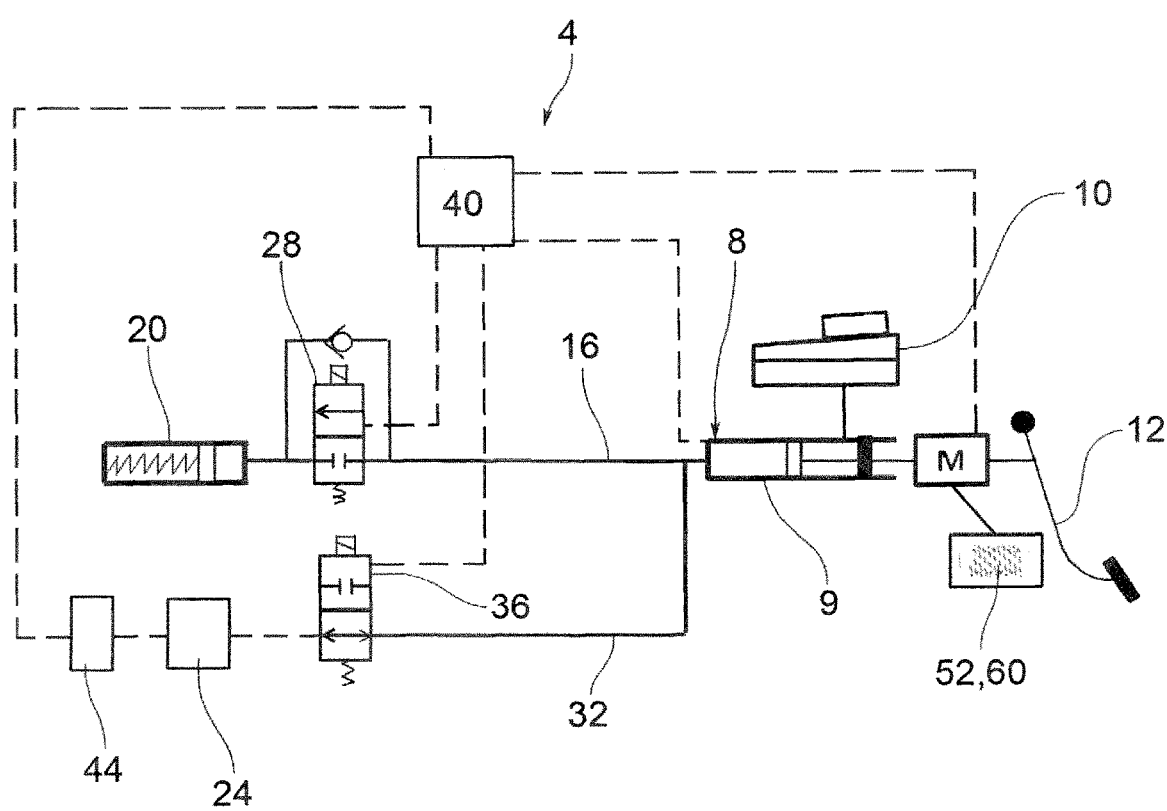

According to a further embodiment (FIGS. 3 to 4), the braking system 4 comprises movable mechanical means 52, arranged between the manual actuation means 12 and the pilot pump 8, wherein said movable mechanical means are operatively connected to the processing and control unit 40 that is programmed so as to induce vibrations on the manual actuation means 12 by actuating the movable mechanical means 52, during the correction of the braking action requested by the user.

For example, the movable mechanical means 52 comprise a rotary electric motor 56 with eccentric mass with respect to a rotation axis of the motor.

It is also possible to provide that the movable mechanical means 52 comprise an electric motor with related translating mass 60. This translating mass 60 will move with a reciprocating rectilinear motion so as to induce the desired vibrations.

According to an embodiment, during the correction of the braking action requested by the user, the processing and control unit 40 is programmed to close the first shut-off valve 28 and to actuate the movable mechanical means 52. In this way the pressure variations in the first conduit are obtained exclusively by means of the movable mechanical means 52.

It is also possible that, during the correction of the braking action requested by the user, the processing and control unit 40 is programmed to open the first shut-off valve 28 and to actuate the movable mechanical means 52. This open condition of the first shut-off valve 28, and activation of the movable mechanical means 52, achieves, first of all, the return of vibrational feedback to the driver. In addition, in the correction state for anti-lock function ABS and/or ESP, the manual actuation means 12, whether pedal or lever, progressively "sinks", reducing the useful travel of the manual actuation means themselves.

According to a further possible embodiment, during the correction of the braking action requested by the user, the processing and control unit 40 is programmed to alternately open and close the first shut-off valve 36 and to actuate the movable mechanical means 52.

This alternating opening/closing condition of the first shut-off valve 28, and activation of the movable mechanical means 52, achieves, returns a vibrational feedback to the manual actuation means 12.

In the state of correction for anti-lock function ABS and/or ESP, the manual actuation means 12, whether lever or pedal, are blocked at the reduced travel imposed by the user in the moment in which the braking correction is actuated for ABS and/or ESP.

At the end of the correction state for ABS and/or ESP, the travel of the manual actuation means 12 is guaranteed for the normal use of the braking system 4.

The processing and control unit 40 is programmed so that, in a power failure condition in which the motor means 44 malfunction, for the actuation of said at least one braking device 24, it commands the closing of the first shut-off valve 28 and the opening the second shut-off valve 36 so as to allow the direct hydraulic actuation of the braking devices 24 by means of the pilot pump 8.

As can be appreciated from the description, the braking system for vehicles according to the invention allows overcoming the drawbacks presented in the prior art.

In particular, the system according to the proposed invention allows returning to the driver a feeling at the pedal or lever of the dynamic state of the vehicle, when they are in the anti-locking function (ABS) or stability control in braking (DSC), or in a situation at the limit of road grip.

The advantage of such a solution is to provide the driver a feeling at the pedal or lever similar to that returned by a conventional hydraulic braking system equipped with ABS and/or DSC (Dynamic Stability Control), so as to signal to the driver a state of potential danger to driving and unfaithful response of the vehicle to the commands of the driver.

Advantageously, the system according to this invention is able to warn the driver of its braking correction intervention: in this way, the driver receives feedback through the manual actuation means, whether lever or pedal, and can for example take notice of the incorrectness of his manner of driving modes and modify it accordingly. As seen, this feedback consists of a reaction to manual control that not only opposes the intensification of the braking action but also tends to reduce it by returning the manual control to a position of lesser braking request.

The system also acts promptly and in a repeatable and reliable manner.

The braking system of this invention has a relatively low cost and adds very limited, and therefore acceptable weight to the vehicle compared to the conventional brake-by-wire solutions of the prior art.

A person skilled in the art, in order to satisfy contingent and specific needs, may make numerous modifications and variations to the braking systems and actuation methods of braking systems for vehicles described above, all however contained within the scope of the invention as defined by the following claims.

The invention claimed is:

1. A braking system for vehicles comprising
   a pilot pump equipped with a manual actuation device comprising a lever or pedal, which is fluidically connected, through a first hydraulic conduit, to a sorbing device that simulates the actuation resistance offered by a hydraulically operated braking device, wherein along said first hydraulic conduit is arranged a first shut-off valve,
   a second hydraulic conduit operatively connected to at least one braking device associated with a wheel of said vehicle, said second hydraulic conduit being connected to the first hydraulic conduit through a second shut-off valve,
   the system comprising a processing and control unit operatively connected to the pilot pump and a motor for actuating said at least one braking device, the processing and control unit being programmed so as to actuate the braking device via the motor as a function of the actuation of the pilot pump through the manual actuation device, in a "by-wire" operating condition,
   in said "by-wire" operating condition, the first shut-off valve being selectively opened and the second shut-off valve being closed, wherein
the processing and control unit is programmed to oversee the operation of the braking system so as to correct the braking action requested by a user via the manual actuation device, by actuating the motor so as to avoid the locking of one or more wheels or the onset of instability of the vehicle during braking,
said processing and control unit being programmed to induce on the manual actuation device at least a vibration when it corrects the braking action requested by the user,
wherein the processing and control unit is programmed so that, during the correction of the braking action requested by the user, it alternately opens and closes the first shut-off valve so as to create a pressure variation on the manual actuation device;
wherein the system comprises at least one device for varying the pressure in the first hydraulic conduit operatively connected to the processing and control unit so as to change the pressure in said first hydraulic conduit to induce at least a vibration on the manual actuation device, during the correction of the braking action requested by the user.

2. The braking system for vehicles according to claim 1, wherein said at least one device for varying the pressure in the first hydraulic conduit comprises an axial or radial piston pump fluidically connected with said first hydraulic conduit.

3. The braking system for vehicles according to claim 1, wherein said at least one device for varying the pressure in the first hydraulic conduit comprises a cam-piston system, the piston being fluidically connected with said first hydraulic conduit.

4. The braking system for vehicles according to claim 1, wherein the said braking devices comprise a disc, drum or shoe brake.

5. The braking system for vehicles according to claim 1, wherein the processing and control unit is programmed so that, in a power failure condition in which the motor malfunction, for the actuation of said at least one braking device, it commands the closing of the first shut-off valve and the opening the second shut-off valve so as to allow the direct hydraulic actuation of the braking devices by means of the pilot pump.

6. An actuation method of a braking system for vehicles comprising the steps of:
providing a pilot pump equipped with a manual actuation device comprising a lever or pedal, which is fluidically connected, through a first hydraulic conduit, to a sorbing device that simulates the actuation resistance offered by a hydraulically operated braking device, wherein along said first hydraulic conduit is arranged a first shut-off valve,
providing a second hydraulic conduit operatively connected to at least one braking device associated with a wheel of said vehicle, said second hydraulic conduit being connected to the first hydraulic conduit through a second shut-off valve,
providing a processing and control unit operatively connected to the pilot pump and to a motor for actuating said at least one braking device as a function of the actuation of the pilot pump through the manual actuation device, in a by-wire operating condition, in said by-wire operating condition the first shut-off valve being selectively open and the second shut-off valve being closed,
correcting the braking action requested by the user via the manual actuation device, via the processing and control unit which actuates the motor so as to avoid locking of one or more wheels or the onset of instability of the vehicle during braking, and
inducing on the manual actuation device at least a vibration when the processing and control unit corrects the braking action requested by a user
wherein the system comprises at least one device for varying the pressure in the first hydraulic conduit operatively connected to the processing and control unit so as to change the pressure in said first hydraulic conduit to induce at least a vibration on the manual actuation device, during the correction of the braking action requested by the user.

* * * * *